Dec. 10, 1940. M. J. WEBER ET AL 2,224,327
WEIGHING SCALE
Filed Oct. 2, 1936  3 Sheets-Sheet 1

Inventors:
Mathias J. Weber
Russell E. Vanderhoff
By:- Cox & Moore attys.

Dec. 10, 1940. M. J. WEBER ET AL 2,224,327
WEIGHING SCALE
Filed Oct. 2, 1936 3 Sheets-Sheet 3

Inventors:
Mathias J. Weber
Russell E. Vanderhoff
By: Cox & Moore attys

Patented Dec. 10, 1940

2,224,327

UNITED STATES PATENT OFFICE 2,224,327

WEIGHING SCALE

Mathias J. Weber and Russell E. Vanderhoff, Chicago, Ill., assignors to Continental Scale Corporation, Chicago, Ill., a corporation of Delaware Application October 2, 1936, Serial No. 103,729

30 Claims. (Cl. 265—27)

Our present invention relates in general to mensuration and has more particular reference to the provision of improved weight measuring apparatus.

An important object is to provide a measuring scale of simplified and inexpensive construction, preferably fabricated principally of sheet metal parts.

Another important object is to provide a light weight scale embodying a counter-balanced beam for weight determination, the beam comprising sheet metal parts suitably interconnected to impart adequate rigidity in the beam to permit the same to be used in the accurate measurement of weights.

Another important object is to provide an improved weighing beam for a weighing scale, including improved means for adjusting weights on the beam for the purpose of weight determination and indication.

Another important object resides in improving and simplifying the construction of the adjustable weights for use on a weighing beam whereby the mass of such weights may be accurately predetermined and adjusted.

Another important object resides in fabricating weights for use in a weighing scale beam by building the same of sheet metal lamination.

Another important object resides in providing improved means for adjustably mounting weights on a scale beam.

Another important object resides in providing improved means for balancing a weighing beam; a further object being to utilize a pinion driven rack for adjusting the beam balancing weight.

Another important object is to provide a simplified sheet metal beam mounting.

Another important object is to provide a weighing scale having a system of interconnected levers carrying a weighing platform including improved means for counter-balancing the levers by means of a weighing beam.

Another important object is to provide simplified and improved, preferably sheet metal, means for mounting the weighing platform on the lever system.

Another important object is to provide an interconnected system of weighing levers wherein the weighing levers comprise sheet metal parts.

Another important object is to build up weighing levers from sheet metal strips suitably bent and interconnected to rigidify the levers.

Another important object is to provide improved stirrups comprising sheet metal stampings for use in interconnecting the levers in a weighing system.

Another important object is to provide a beam-type weighing scale comprising a sheet metal box on which the beam is pivoted in position to extend externally of the box, an interconnected system of weighing levers within the box and operatively connected with the weighing beam, including a weight receiving platform carried by the levers and extending in position to form a top closure for said box; a further object being to provide a means for retaining the weight-carrying platform on the box without impairing the weighing function of the scale elements.

Another important object is to mount the weighing levers on the side walls of the box while forming the bottom of the box with feet forming depressions whereby all of the weight applied on the weighing levers is transmitted solely through the sheet metal walls of the box.

Another important object is to provide a weighing scale adapted for general weighing purposes and having an attachment whereby the same may be constituted particularly for the weighing of infants so as to provide weighing apparatus having utility as a combined baby scale and general utility scale.

These and numerous other objects, advantages, and inherent functions of the invention will become apparent as the same is more fully understood from the following description which, taken in connection with the accompanying drawings, discloses a preferred embodiment of the invention.

Referring to the drawings.

To illustrate our invention we have shown on the drawings a weighing scale comprising a main frame 21 in which is mounted a system of levers forming an inter-connected system, on which is carried a weight-receiving platform 25. Means for counter-balancing the lever system is also mounted on the support frame 21, the counter-balancing means in the illustrated embodiment comprising a weighing beam 27.

The frame 21, of course, may be of any suitable construction, but we prefer to form the same as a box-like element comprising a sheet metal strip 29 bent to rectangular form providing side walls 31 and 33 and end walls 35, the opposed ends of the strip being preferably brought into abutting relationship and secured together to form a seam 37 in the side wall 33. A beam supporting bracket 39 is attached to the outer surfaces of the side wall 33 in position bridging the seam 37 in order to strengthen the same while at the same time providing a mounting for the beam 27. The bracket 39 may be secured on the walls 33 in any suitable or preferred manner, as for example by welding the same in place.

The bottom of the frame 21 is preferably closed by means of a plate 41, preferably of sheet metal and having upstanding marginal flanges 43 which may be formed on the plate by a simple stamping operation. The flanges 43 are arranged in position to fit snugly within the box walls 31, 33, and 35 so that the bottom plate 41 may be attached on the wall portions in any suitable fashion as by welding the parts together. The bottom plate, of course, strengthens and rigidifies the wall portions of the frame and may be formed as at 45 with feet forming depressions, the entire frame being supported by the depressed portions 45.

Within the box-like frame 21 we arrange the lever system 23, which comprises a pair of opposed lever elements 47 and 49 which are fulcrumed on the opposed ends of the frame and extend toward each other. The levers 47 and 49 are of substantially similar construction, each preferably comprising a pair of leg elements 51 and 53, the elements 51 preferably comprising strips of sheet metal and the elements 53 likewise preferably comprising strips of sheet metal somewhat longer than the strips forming the portions 51. The strips 51 and 53, however, are preferably formed in flat condition and are connected together in spaced-apart relationship by bracing means 55, which may and preferably does comprise a strip of sheet metal bent intermediate its ends to provide a portion 57 on which the leg portion 51 is secured as by welding or otherwise, the opposite ends of the bracing strip 55 being bent to provide portions 59 and 61 on which the leg element 53 is secured in any suitable fashion as by welding. Each of the elements 51, 53, and 55 at the end thereof carries a pair of knife edge elements 65 and 66, the elements 65 being located closely adjacent an end of the leg element and near a lateral edge thereof, while the element 66 is located inwardly of the end of the leg element adjacent the opposite lateral edge thereof. The elements 65 and 66 preferably comprise pins of hardened steel driven into and frictionally retained in openings formed in the elements 51 and 53. The leg elements 53 also each carry a bearing pin 67 of character similar to the pins 65 and 66, said pins 67 being arranged in the elements 53 at the ends thereof opposite from the ends carrying the pins 65 and 66. The pins project outwardly on the sides of the leg portions 53 facing away from the leg portions 51, the outer ends of the pins 67 being bent as at 69, the pin of the lever 49 being bent upwardly while the pin of the lever 47 is bent downwardly for a purpose hereinafter more fully explained.

It will be seen that by pre-fabricating the leg portions 51 and 53 with the pins 65 and 67 in place that the manufacture of these parts is facilitated and rendered extremely inexpensive since the legs and pins may be fabricated in suitable die means so that the several pins 65, 66 and 67 may be placed in the leg elements and located therein with extreme accuracy. The connecting elements 55 may then be formed as separate elements and the lever system assembled in a die so that the pins 65 of the leg portions 51 may be accurately alined with the pin 65 of the leg portions 53. Thereupon, the parts may be welded together to form the finished lever.

The levers 47 and 49 are mounted in the frame 21 each by means of two, preferably sheet metal, stirrups 71 which may be of identical form and construction and which further may be fabricated in a suitable stamping and bending die. The stirrups 71 each comprise a formed element having a pair of downwardly extending legs 73, the lower extremities of which are curled to form hooks 75. The stirrups 71 also have an upwardly extending hooked arm 77.

The frame 21 is formed with stirrup mounting means, preferably comprising a pair of sheet metal straps or bars 79 extending between and secured to the opposite side walls 31 and 33 of the box-like frame. The straps or bars 79 to this end have bent ends 81 which may be welded or otherwise suitably secured to the side walls. The straps or bars 79 are spaced from the end walls 35 and each carries a preferably sheet metal guide plate 83 having spaced notches 85. The stirrups 71 are hung on the bars 79 by means of the hooked portions 77 thereof, said portions 77 being hooked on the bars 79 at the notches 85 which serve to retain the stirrups against lateral movement on the support bars 79. The levers are suspended on the hooks 75 by engaging the opposite ends of the pins 65 in the dependent hooked portions 75 of the stirrups. So hung, the leg portions 51 and 53 extend in the space between the stirrup legs 73. The bar 79 on which the lever 47 is thus hung is disposed in the frame 21 in position slightly lower than the elevation at which the bar 79 carrying the lever 49 is mounted so that the lever 47 may extend in a plane below the plane of the lever 49. So arranged, the ends of the leg portions 53 of the several levers will extend in vertically super-posed position in the frame 21 with the pins 67 in substantially vertical alinement. The lever 49 thus overlies the lever 47 and the levers are connected together by means of a loop 87 which encircles both of the pins 67. This loop 87 may comprise a length of hardened steel wire formed into an oval-shaped loop and will be retained on the pins 67 against lateral displacement because of the bent ends 69 of said pins. The end of the leg portion 53 of the lever 47 outwardly of the pin 67 is formed preferably with a pair of upstanding arms 89 which may be of sheet metal and which extend on opposite sides of the leg portion 53 of the lever 49 to prevent undue relative lateral movement of the leg portions 53 of both levers. These retaining arms 89, however, do not interfere with the tilting movement of the levers with respect to the support frame.

The end of the leg portion 53 of the upper lever 49 carries an extension 91 which may be welded or otherwise secured on said leg portion outwardly of the pin 67. This extension is preferably formed with a bent end 93 adapted to extend through an opening 95 formed in the wall 33 of the frame adjacent the beam bracket 39. The extension 91 thus provides a means for connecting the lever system 23 on the beam 27 outwardly of the box-like frame 21 in a manner hereinafter more fully described. The beam 27, however, is adapted to counter-balance the levers as well as the weighing platform 25 which is carried on the levers and also any weight applied on the platform 25. Counter-balancing is accomplished by means of weights shiftable on the beam and the beam also has a scale showing the adjusted position of the counter-balancing weights in terms of the weight of an object applied on the weighing platform.

The weighing platform 25 preferably comprises a sheet metal plate 97 of a size sufficient to cover and enclose the upper open end of the box-like frame 21, the plate 97 having a marginal flange 99 adapted to overlie the upper edge of the box-like frame in order to improve the finished appearance of the scale and aid in excluding access of dirt and other foreign matter in the casing. The platform is supported on the counter-balance lever system by means of platform legs which we prefer to form entirely of sheet metal strips attached to the under side of the plate 97. To this end we provide a pair of strips 101, each of which is bent at its opposite ends to form legs 103 and 105 for attachment on the plate 97, the extremities of said legs being bent as at 107 to provide for the attachment of the legs on the under side of the plate 97, attachment being accomplished in any suitable fashion, as for example, by welding. The legs 103 are somewhat longer than the legs 105 in order to accommodate the difference in elevation of the levers 47 and 49, the leg forming strips 101 having intermediate portions interconnecting the legs 103 and 105 and these intermediate portions provide means for mounting platform bearings 109. These bearings 109 comprise preferably sheet metal plates 111 which are secured in notches formed at the opposite ends of bearing support strips 113. These strips, which are preferably of sheet metal, have intermediate portions extending between and welded or otherwise secured to leg forming strips 101 at opposite ends of the platform, the opposed extremities of the bearing strips 113 being bent downwardly to carry the bearing plates 111 in downwardly facing position.

The foregoing arrangement provides a bracing effect for the plate 97 which effect sufficiently rigidifies the plate against bending so that the plate 97 may be of unusually thin material thereby reducing the cost of constructing the scale without sacrificing accuracy. The bearing plates 111 are arranged in position to ride upon the pivots 66 of the several levers and we prefer to form the bearing plates 111 which ride upon the pivot pins 66 of the lever 49 as grooved elements while the plates 111 which ride on the pivot pins of the lever 47 are flat. The relative position of the weighing platform with respect to the levers is thus determined by the grooves of the plates 111, the grooved plates 111 which bear upon the lever 49 and the flat plates which bear upon the lever 47 being self-alining with respect to the pivot pin 66 on which they rest.

The frame 21 preferably carries sheet metal elements 115 which are secured on and extend inwardly of the opposite end walls 35 of the frame. These elements 115 may comprise sheet metal stampings providing cam-like prongs and serves as latches to retain the platform element in assembled position on the levers. To this end the platform plate 97 on its under side and at each end thereof is provided with preferably sheet metal detents 117, each of which has an opening 119 adapted to receive the latch prongs 115 when the platform is assembled upon the levers. The detents 117 have a certain amount of resilience and as the platform element is forced downwardly into position in the casing 21, the detent elements 117 will ride on and be depressed by the cam-like prongs 115 until said prongs are able to enter the openings 19, at which time the detent elements 117 will snap into position engaging the under side of the prongs 115 thereby preventing removal of the platform element 25 from assembled position. The openings 119, however, are sufficiently large to permit free downward movement of the platform 25 under the influence of a weight applied thereon and without interference from the prongs 115.

The beam 27 comprises a preferably sheet metal element 121 forming an escutcheon plate, and the element 121 is preferably formed of unusually thin gauge material. The plate 121 is of rectangular elongated configuration and preferably extends along the side 33 of the frame 21. The plate 121 may be formed as a stamping with flanged upper and lower edges 123. At one end of the plate the edges 123 are extended as at 125 to form a guideway for receiving a balancing weight 127 comprising a plurality of sheet metal laminations 129 of preferably rectangular configuration, each of said laminations having a slot for receiving the struck-out portion 131 of a preferably sheet metal frame 133, said frame comprising a strip of material, the opposite ends of which are bent as at 135 to slidingly engage the grooves provided by the extended flanges 125 of the beam element. One of the edges of the strip 133 is formed with rack teeth 137 adapted to engage a pinion 139 mounted on a pin 141 which is rotatably mounted in an opening formed in the plate 121 with the pinion 139 concealed on the back of the plate 121 while the stem 141 carries an adjusting handle 143 exposed on the forward face of the escutcheon plate.

The adjusting handle 143 is preferably of knob-like character forming a pointer adapted to cooperate with an index scale 145 suitably arranged on the forward face of the escutcheon plate in order to indicate the relative adjusting position of the weight 127. Adjustment of said weight, of course, is accomplished by rotating the knob 143 in order thus to cause the frame 133 and the weights carried thereby to be shifted longitudinally on the beam. Adjacent the flanges 125 the escutcheon plate carries a bracket 145 comprising preferably a sheet metal stamping having a flange 147 by means of which the bracket may be riveted or otherwise suitably secured upon the back of the plate 121. The bracket has another flange 149 spaced behind the plate 121 and carrying pivot pins 151 and 153 in parallel spaced-apart relationship on the flange 149. These pivot pins may be of character similar to the pivot pins 65 and 66 and may be mounted in openings in the flange 149 in position such that they extend on opposite sides of said flange. The pin 151 provides means for tiltingly mounting the beam on its support bracket 39 while the pin 153 provides means for connecting the beam with the end 93 of the lever system. It will be noted that the flanges 147 and 149 extend in intersecting planes so that the pins 151 and 153, which extend at right angles through the flanges 149, are not normal to the plane of the plate 121. The pin 151, however, is mounted on the bracket 39 in horizontal position so that the plate 121 is supported in inclined position extending upwardly and rearwardly in order to present the same in more readily readable position in the scale assembly. The bracket 39 preferably comprises a sheet metal strip formed and bent to provide a portion 155 at one end of the strip, said portion being adapted for attachment on the side wall of the frame 21. Intermediate the ends of the strip is a portion 157 extending in a common plane with the portion 155 and likewise adapted for attachment on the wall 33. Intermediate the portions 155 and 157, the mounting bracket 39 is formed with a bearing support portion 161 in position spaced from the wall 33 on which the bracket is mounted.

Figures 6, 7, 8, 9:
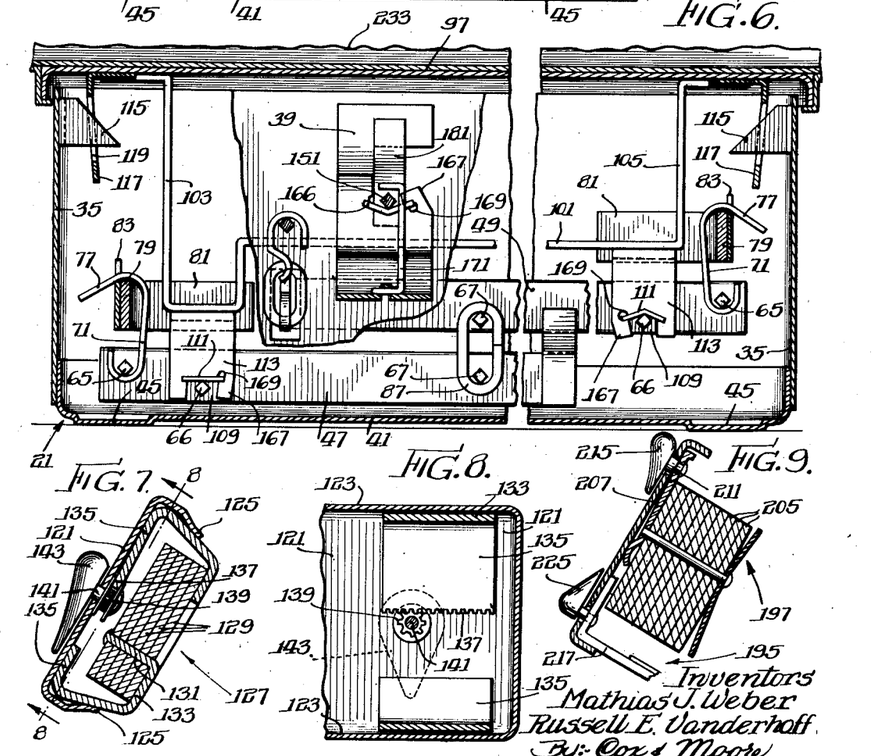
Figure 6 is a sectional view taken substantially along the line 6—6 in Figure 1.
Figures 7, 8, and 9 are sectional views taken substantially along the lines 7—7, 8—8, and 9—9, respectively, in Figure 4.
Figure 10:
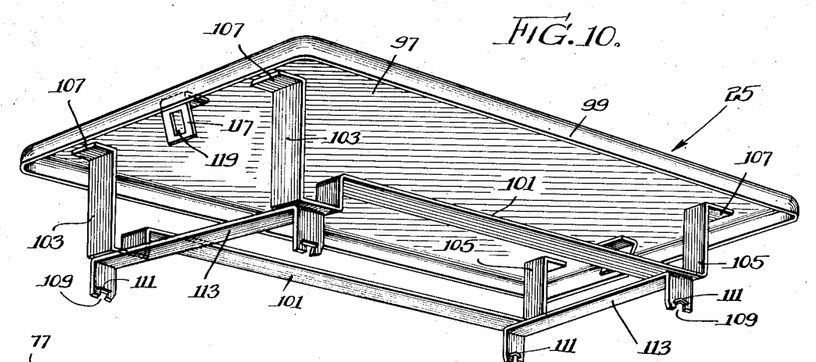
Figure 10 is a perspective view of a weight-carrying platform forming a part of the scale shown in Figure 1.
Figures 11, 12, 13:
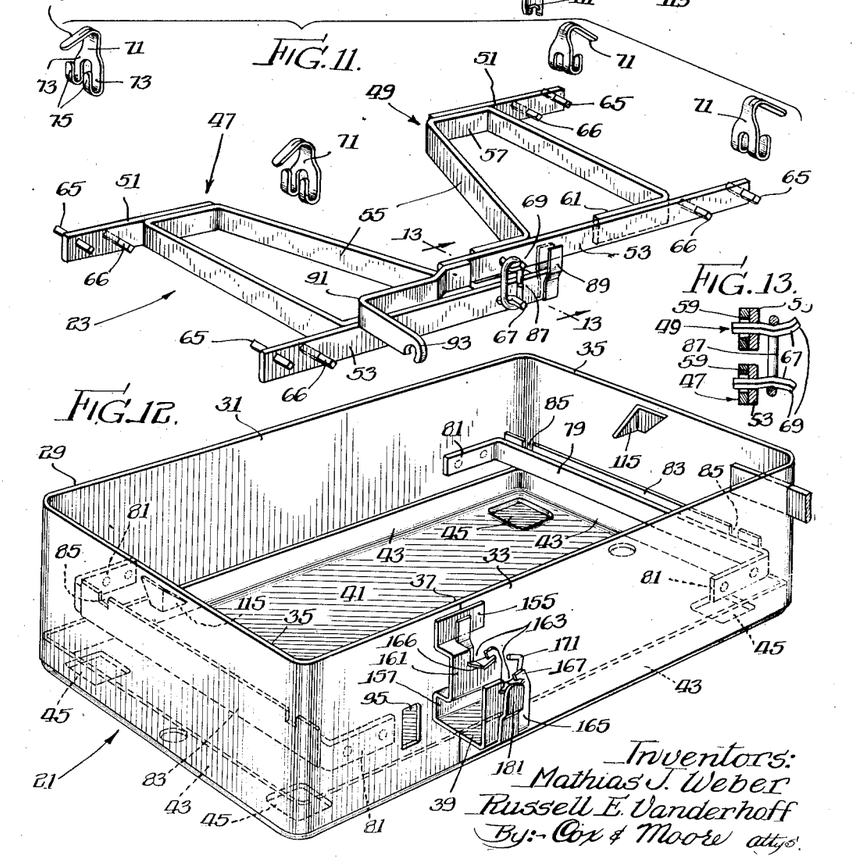
Figure 11 is an exploded view of means forming an interconnected system of weighing levers forming a part of the scale shown in Figure 1.
Figure 12 is a perspective view of a support frame on which the weighing mechanism of the scale shown in Figure 1 is operatively mounted.
Figure 13 is a sectional view taken substantially along the line 13—13 in Figure 11.

The bracket 39 also includes a bearing support portion 165 in spaced relationship and preferably parallel with respect to the portion 161, the portions 161 and 165 both being formed with upwardly facing notches 163 similar to the notches 109 in the platform assembly and these notches 163 carry a pair of V-shaped plates 166 similar to the bearing plates 111 of the platform assembly which rests upon the lever 49. The notches 109 and 163 are defined on one side by an arm 167 which is weakened by means of a drilled perforation 169 at the base of the arm 167. The arm 167 has a tongue so that by inserting the bearing plates in the notch and bending the arm 167 over upon the bearing plates, as clearly shown in Figure 6, the same may be anchored in place. The bearing plates 166 as well as the plates 111 at their opposite edges are notched to receive the bent arm 167 so that the parts are interlockingly secured together. The plates 166, however, as well as the plates 111 are relatively loosely held in the notches and may turn in order to constitute the same as self-alining bearings.

The beam is tiltably mounted on the bracket 39 by assembling the flange 149 in position between the bearing support portions 161 and 165 with the opposite ends of the pin 151 riding on the notched plates 166. The bracket 39 includes a spring-like element 171 which may be bent into position overlying the pin 151 after the same has been assembled on the bearings whereby to prevent displacement thereof upwardly and out of the notches 163.

Figure 5:
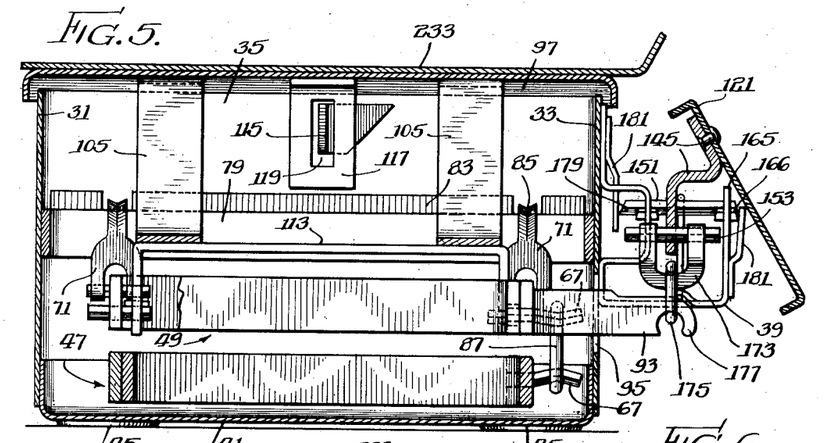
Figure 5 is a sectional view taken substantially along the line 5—5 in Figure 1.

The opposed ends of the pin 151 are bevelled or chamfered to provide points 179, as clearly shown in Figure 5 of the drawings, and the bracket is formed with preferably hardened portions 181 in position opposite the opposed ends of the bearings 166 to resiliently engage the pointed ends of the pin 151 whereby to yieldingly prevent axial movement of the pin 151 in the bearings without, however, imparting appreciable frictional effect. The beam is thus firmly yet yieldingly held in proper operating position in its bearings.

The pin 153 is connected on the projecting portion 93 of the lever system by means of a stirrup 173 and a link 175. The stirrup 173 to this end comprises a sheet metal stamping of substantially U-shaped configuration, the arms defining said U-shaped stamping having hooked ends adapted to ride upon the opposed ends of the pin 153, the intermediate portions of said stirrup extending around the end of the flange 149 and carrying the link 175, which may comprise a length of hardened steel wire similar to the link 87 of the lever system. This link 175 may be connected to the projection 93 which is preferably provided with a hooked portion 177 forming a nose or finger adapted to receive said link.

Figures 1, 2, 3, 4:
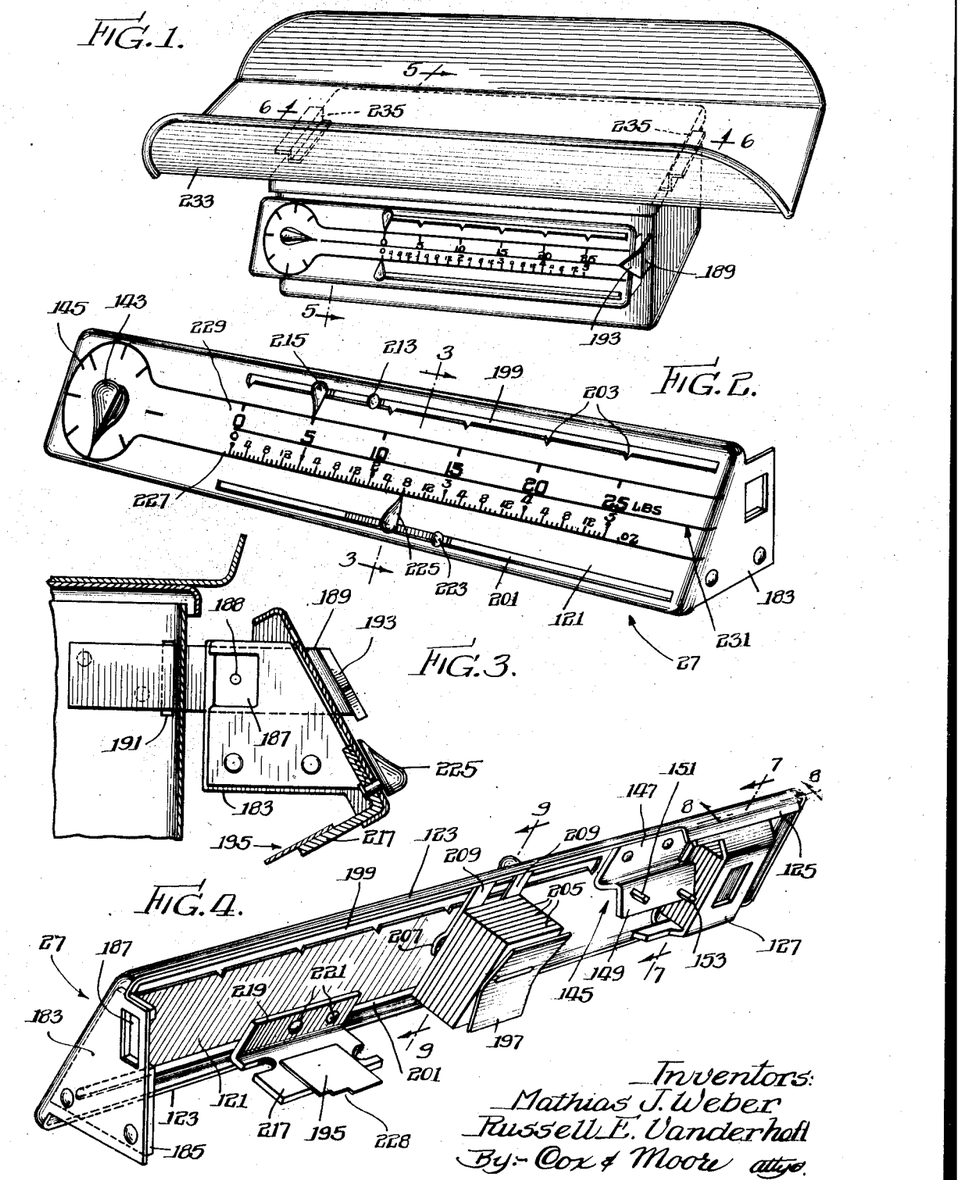
Figure 1 is a perspective view of a weighing scale embodying our present invention.
Figure 2 is an enlarged perspective view of a weighing beam forming a part of the scale shown in Figure 1.
Figure 3 is a sectional view taken substantially along the line 3—3 in Figure 2.
Figure 4 is a perspective view showing the back of the beam illustrated in Figure 2.

The end of the plate 121 opposite from the end at which the balancing weight 127 is mounted, is formed with a substantially triangular flange 183, as clearly shown in Figures 2 and 4. This flange is preferably strengthened and rigidified by means of a plate 185 which may be riveted or otherwise secured on the flange and both the flange 183 and the plate 185 are formed with an opening 187 in position to receive a preferably pin-like projection 188 formed on an index or pointer element 189 in order to limit the tilting movement of the beam on its support pivot. The pointer element 189 preferably comprises a strip of sheet metal welded or otherwise secured on the frame 21, said strip having an end extending through an opening 191 formed in the wall element 29 at a corner of the box-like frame, as clearly shown in Figure 3. The pointer has a portion 193 extending outwardly of the box-like frame in position to overlie the end of the beam, to indicate the balanced condition of the same.

The escutcheon plate 121 also is formed with means for adjustably supporting counter-balancing weights 195 and 197, said weights preferably being carried on the rear side of the plate 121. To this end, the plate 121 is preferably formed with an elongated slot 199 near the upper edge thereof and a slot 201 extending adjacent the lower edge of the plate. Both slots 199 and 201 may extend from a point in the plate adjacent the bracket 145 toward the remote end of the plate. The slot 199 also is preferably formed at intervals with notches 203, the balancing weight 197 preferably comprising a plurality of sheet metal plates 205 which are riveted upon a frame element 207 having a pair of arms 209 carrying pins 211 in position to extend into slot 199 for sliding movement therein. One of the pins 211 is provided with a button 213 to retain the same in the slot while the other pin is formed with a knob-like slide and index handle 215 which is exposed on the front of the plate 121. The counter-balancing weight 195 preferably comprises a sheet metal strip which may be soldered or otherwise secured on a frame or support 217, preferably formed of sheet metal and having a flanged portion 219 adapted to slidingly engage the back side of the plate 121 opposite the slot 201. This bracket 217 is provided with a pair of stems 221 adapted to extend in and ride along the slot 201. One of these pins 221 is headed as at 223 to retain the same in the slot while the other pin carries a manually operable handle and index element 225 similar to the handle element 215 of the other counter-balancing weight assembly. It will be noted from an inspection of Figure 9 of the drawings that the weights 195 and 197 are freely movable past each other on the plate 121. It will be noted that the balancing weight 127 as well as the counter-balancing weight 197 are extremely simple and of inexpensive character, comprising merely metal plates riveted together and upon the weight supporting frames. It is possible to accurately adjust the mass of either of said weights 127 and 197 by drilling perforations in as many of the laminations comprising said weights as may be necessary to reduce the combined weight of the laminations to an exact predetermined or desired mass. The counter-balancing weight 195 also may be accurately adjusted since the same is of thin metal stock, adjusting the mass of the weight 195 which, of course, includes the mass of the sliding frame 217, may be accomplished by cutting away portions of the weight 195 as indicated at 228.

The front of the plate 121 also carries graduated scales 227 and 229, the scale 229 being graduated in relatively large units of weight, each graduation of said scale 229 extending opposite a notch 203 of the slot 199. The scale 227 is graduated in relatively small units of weight and in the illustrated embodiment, I have shown the scale 229 graduated in units of five pounds while the scale 227 represents five pounds graduated in ounces.

In order to operate the scale, it is necessary to preliminary balance the scale by setting the shiftable index elements 215 and 225 opposite the zero marks of the scales 227 and 229. By manipulating the knob 143, the balancing weight 127 may be adjusted until the beam swings freely in balanced condition with the balancing line 231 opposite the pointer 193. After the scale has thus been balanced, the weight to be measured may be applied on the platform 25 and this, of course, will throw the beam out of balance. The counter-balancing weights 195 and 197 may then be manipulated to again bring the beam into balanced condition whereupon the weight of the object to be measured may be determined by reading said weight on the scales 227 and 229.

The scale may be used to measure the weight of the objects deposited directly on the platform 97 and when so used has general utility in measuring any weight within the range of the scale. We have, however, provided an attachment comprising a preferably sheet metal cradle 233 having flanged lugs 235 upon the under side of said sheet metal cradle. These lugs may be formed integral with the cradle element by stamping the same therefrom or may be separate pieces welded or otherwise secured upon the cradle. The lugs, however, are disposed in spaced relationship adapted to snugly fit upon the opposed edges of the plate 97 so that by sliding the cradle laterally upon the plate 97 it may be firmly secured thereto. The cradle attachment makes the scale available for the purpose of weighing infants and thereby increases the commercial value of the scale which may be sold initially for baby weighing purposes and thereafter utilized by the owner for general weighing purposes merely by dismounting the cradle 233.

In any event the balancing adjustment provided for by the shiftable weight 127 may be utilized to initially balance the beam whether the cradle 233 is applied to the platform or whether the platform is used without the attachment.

It is thought that the invention and its numerous attendant advantages will be understood from the foregoing description and it is obvious that numerous changes may be made in the form, construction, and arrangement of the several parts without departing from the spirit or scope of the invention and without sacrificing its attendant advantages, the forms herein described being preferred embodiments for the purposes of demonstrating the invention.

Having thus described the invention, what is claimed as new and is desired to be secured by Letters Patent of the United States is as follows:

1. A weighing scale comprising a frame including an open-top base formed of sheet metal and including parallel side walls and parallel end walls, a system of interconnected levers fulcrumed on said frame, said levers including a portion passing laterally through an opening in one of said side walls, means to apply a weight to be measured on said lever system, means operatively connected with said system to counterbalance the applied weight, including scale means for indicating the counterbalanced weight, wherein the counterbalancing means comprises a beam tiltingly mounted on bearing means carried on said frame and operatively connected to said lever system, said bearing means being secured on said base adjacent that end of said lever system which projects through said opening, and balancing weight means adjustable on said beam, said beam comprising an elongated sheet metal member extending longitudinally of one of the side walls of said base substantially coextensive therewith and being formed with openings comprising an upper groove extending parallel with and adjacent the upper longitudinal edge of said beam and a lower groove extending adjacent and parallel with the lower longitudinal edge of said beam, said weight means being carried on the back of said member, means extending in said opening and forming weight shifting handles on the front of said member and means forming a scale on said beam adjacent said weight shifting handles wherein the handles form pointers to cooperate with the scale.

2. A weighing scale as defined in claim 1 wherein one end of said beam is provided with an adjustably shiftable means on its front face and shiftable weight means on its rear face connected through the beam with said adjustably shiftable means whereby initially to balance the beam.

3. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, one of said levers comprising a pair of sheet-metal strip portions, pivot pins in each strip portion and extending in alignment on opposite sides of said strip portions, said pivot pins providing a fulcrum pivot and an adjacent loading pivot in each strip portion, means rigidly interconnecting said strip portions together with the corresponding fulcrum and loading pivots in axial alignment, and means on said lever forming a connecting pivot extending parallel to and in position spaced from said fulcrum and loading pivots.

4. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a pair of sheet metal straps and means to support the same in spaced parallel relationship, said lever system being fulcrumed on the frame by sheet metal stirrups having hooked portions adapted to hang on an edge of said straps, and support portions to receive the fulcrum pivots of the levers.

5. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a pair of sheet-metal straps and means to support the same in spaced parallel relationship, said lever system being fulcrumed on the frame by sheet-metal stirrups having hooked portions adapted to hang on an edge of said straps and support portions to receive the fulcrum pivots of the levers, and means on said straps forming spaced-apart facing abutments in position on the straps to prevent lateral displacement of said hooked portions on said straps.

6. A weighing scale as set forth in claim 5, wherein the spaced abutments are formed by plate-like means having notches therein and secured on said straps.

7. A weighing scale comprising a frame, a system of interconected levers fulcrumed on said frame, means to apply a weight to be measured on said lever system, means operatively connected with said system to counterbalance the applied weight, including scale means for indicating the counterbalanced weight, said frame comprising sheet-metal means forming a base and vertical opposed walls, a pair of metallic bars secured at their opposed ends on the opposite walls of said housing, said bars serving to brace and space the said opposed walls, and means to fulcrum the levers of said system on said bars.

8. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a rectangular sheet metal strip bent to form the side walls of an enclosure or housing, the opposed ends of the strip being secured together, a sheet metal plate forming a bottom for said housing having marginal flanges secured to the edges of said strip, depressions in said plate, forming feet for said housing, a pair of metallic bars secured at their opposed ends on the strip forming the walls of said housing and serving to brace and space the same, and means to fulcrum the levers of said system on the said bars.

9. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the means to apply a weight to be measured on the levers comprises a sheet metal plate forming a platform, a pair of sheet metal straps extending in parallel spaced relationship along the opposed edges of said plate and having opposite ends of said straps bent and secured to the plate at the opposite ends thereof, and sheet metal strips interconnecting said straps adjacent the bent end portions thereof, said strips having dependent portions formed with bearing means for engaging the levers of said system.

10. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with a groove and said weight means having a portion extending in and shiftable along said groove.

11. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, balancing weight means adjustable on said beam, said beam comprising an elongated sheet metal plate formed with a groove and said weight means comprising a frame having a portion extending in and shiftable along said groove, said beam carrying a fulcrum pin rockingly received in said bearing means, and a pivot, said lever system including a finger portion extending beneath said pivot and a link rockingly mounted on said finger portion and on said pivot for operatively connecting said beam with said lever system.

12. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, balancing weight means adjustable on said beam, said beam comprising an elongated sheet metal plate, a pivot frame secured on said beam and carrying a fulcrum pin therein having a knife edge for reception in said bearing means, said pivot frame also carrying a connecting pivot spaced from said fulcrum pin, said lever system having a portion extending adjacent said pivot, and link means rockingly engaging said pivot and said projecting portion of the lever system to form a driving connection therebetween.

13. A weighing scale as set forth in claim 12, including interengaging means on said bearing means and on said pivot frame for retaining said fulcrum pin against displacement from said bearing means.

14. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with an opening, said weight means comprising a frame on the back of said plate and means extending in said opening and forming a weight shifting handle on the front of said plate.

15. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with an opening, said weight means comprising a frame on the back of said plate, and means extending in said opening and forming a weight shifting handle on the front of said plate, a turnable stem drivingly connected with said handle, and means to shift said weight means in response to turning movement imparted to said stem by the manipulation of said handle.

16. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with an opening, said weight means comprising a frame on the back of said plate, and means extending in said opening and forming a weight shifting handle on the front of said plate, a turnable stem drivingly connected with said handle, a rack on said weight means, and a pinion on said stem and drivingly engaging said rack, whereby to shift the weight means in response to turning movement of the stem imparted by manipulation of said handle.

17. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with an opening, said weight means comprising a frame on the back of said plate and means extending in said opening and forming a weight shifting handle on the front of said plate, said sheet metal plate having a rearwardly extending, longitudinal flange thereon for strengthening and rigidifying said plate adjacent said opening.

18. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with an opening, and means extending in said opening and forming a weight shifting handle on the front of said plate, said plate having a perforation at an end thereof, indicator means formed on said plate at said end in position to cooperate with index means on said frame, said index means comprising a projection on said frame having a portion extending in said perforation whereby to limit the tilting movement of the beam at said end thereof.

19. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with a slot and said weight means comprising a support on the back of said plate and having a projection in said slot forming a weight shifting handle on the front of said plate, said slot having spaced notches in its lower edge to receive said projection and hold the weight means in adjusted position along said slot.

20. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, balancing weight means adjustable on said beam, said beam comprising an elongated sheet metal plate formed with inturned marginal flanges forming ways in its opposed edges and said weight comprising a sheet metal plate bent to form a frame having portions slidably received in said ways, said frame forming plate having an edge forming a rack, a pinion on said beam forming plate in position to engage said rack on the back of said beam forming plate whereby to shift the frame on the beam, and means forming a weight shifting handle on the front of said beam forming plate and operatively connected with said pinion.

21. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated member formed with an opening, said weight means being carried on the back of said member, means extending in said opening and forming a weight shifting handle on the front of said member, and means forming a scale on said beam adjacent said weight shifting handle, wherein the handle forms a pointer to cooperate with said scale.

22. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated member formed with an opening, said weight means being carried on the back of said member, means extending in said opening and forming a weight shifting handle on the front of said member, and means forming a scale on said beam adjacent said weight shifting handle, wherein the handle forms a pointer to cooperate with said scale, and said scale being calibrated to indicate the position of the weight in terms of the weight applied on said lever system for measurement.

23. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprises a beam tiltingly mounted in bearing means carried on said frame and operatively connected with said lever system, and balancing weight means adjustable on said beam, said beam comprising an elongated sheet metal plate formed with a bracket of sheet metal having portions extending in intersecting planes, one of said portions being secured on said beam forming plate and the other having a pair of bearing pins extending in parallelism therein and normal to the plane thereof, one of said pins serving to fulcrum the beam on the frame and the other serving to connect the beam with the lever system.

24. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a rectangular sheet metal strip bent to form the side walls of an enclosure or housing, the opposed ends of said strip being in abutting relationship, means forming a bracket secured externally on said housing in position bridging said abutting edges to hold the same together, means to mount said lever system within said housing, a lever of said system having an arm extending out of said housing through an opening adjacent said bracket, a counterbalancing beam fulcrumed on the bracket, and link means connecting the beam with said outwardly extending arm.

25. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising sheet metal means bent to form the side walls of an enclosure or housing, said lever system being mounted within said side walls and having a finger portion extending outwardly through an opening therein, means forming a bearing bracket on said frame adjacent said opening, a counterbalancing beam fulcrumed on said bearing bracket, and link means connecting the beam with said projecting finger portion.

26. A weighing scale as set forth in claim 25, wherein said lever system comprises a pair of opposed, interconnected levers, one of which is formed with an extension forming said projecting finger portion, said opposed levers having each a pair of prismatic fulcrum pins of hardened material secured thereon in axial alinement to form bearing edges, a pair of bars in said housing and secured at their opposed ends upon the opposed side walls of said housing, said bars serving to brace and space the said side wall, and links rockingly mounted on said bars and tiltably receiving the bearing edges of said fulcrum pins whereby to rockingly suspend said lever system within said housing.

27. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a bracket formed with a pair of spaced apart upwardly facing bearings in alinement and said counterbalance means comprising a beam having a sheet metal portion having a pivot pin extending on opposite sides thereof in position to seat in said bearings, and means on said bracket bendable into position to retain said pivot pin in said bearings after assembly therein.

28. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, said frame comprising a bracket formed with a pair of spaced apart upwardly facing bearings in alinement and said counterbalance means comprising a beam having a sheet metal portion having a pivot pin extending on opposite sides thereof in position to seat in said bearings, the opposed ends of said pin being formed to produce points therein in alinement with the knife edge thereof, and means on said frame abutting said points whereby to prevent endwise movement of the pin in said bearings, said pointed ends having substantially frictionless engagement on said abutting means.

29. A weighing scale comprising a beam, a weight shiftable on said beam and comprising a sheet metal frame, a plurality of sheet metal laminations secured in stacked relationship on the frame, said laminations being formed each with a slot and said frame having an integral portion struck therefrom and extending in the slots of the laminations to secure them on the frame.

30. A weighing scale comprising a frame, a system of interconnected levers fulcrumed on said frame, means to apply a weight to be measured on said lever system, means operatively connected with said system to counterbalance the applied weight, including scale means for indicating the counterbalanced weight, wherein the counterbalancing means comprising a beam tiltingly mounted in bearing means carried on said frame and operatively connected with said lever system, balancing weight means adjustable on said beam, said beam comprising an elongated sheet metal plate formed with a pair of parallel slots therein and said weight means comprising a pair of weighted frames mutually shiftable past each other on the beam, one of said frames being formed to accommodate passage of the other, one frame carrying relatively more weight than the other and the heavier frame serving to make a coarse adjustment and the other to make intermediate adjustments, and scale means on said beam whereby the position of the heavier weight on the beam may be measured only in terms of predetermined units of weight while the position of the lighter weight may be measured in terms of subdivisions of the predetermined unit, said weight being accurately predetermined so that the scales of both weights are of equal length on the beam.

MATHIAS J. WEBER.
RUSSELL E. VANDERHOFF.

DISCLAIMER 2,224,327.—*Mathias J. Weber* and *Russell E. Vanderhoff*, Chicago, Ill. WEIGHING SCALE. Patent dated December 10, 1940. Disclaimer filed February 25, 1943, by the assignee, *Continental Scale Corporation*.

Hereby enters this disclaimer to claims 1, 2, 4, 5, 7, 10, 11, 12, 13, 14, 15, 17, 18, 19, 21, 22, 25, 26, 28, and 30 in said specification.

[*Official Gazette March 23, 1943.*]